United States Patent [19]
Buhrmann et al.

[11] Patent Number: 5,903,845
[45] Date of Patent: May 11, 1999

[54] PERSONAL INFORMATION MANAGER FOR UPDATING A TELECOMMUNICATION SUBSCRIBER PROFILE

[75] Inventors: Michael Buhrmann, Redmond; Jane Elizabeth Montemayor, Bellevue, both of Wash.

[73] Assignee: AT&T Wireless Services Inc., Kirkland, Wash.

[21] Appl. No.: 08/657,497

[22] Filed: Jun. 4, 1996

[51] Int. Cl.⁶ .............................. H04M 11/00; H04M 1/64
[52] U.S. Cl. .......................... 455/461; 455/414; 455/412; 379/210
[58] Field of Search .............................. 379/93.01, 93.03, 379/93.05, 93.21, 111, 112, 113, 121, 128, 130, 131, 202, 204, 210, 211; 455/450, 417, 445, 461, 412, 414, 435

[56] References Cited

U.S. PATENT DOCUMENTS

| | | | |
|---|---|---|---|
| 4,872,005 | 10/1989 | DeLuca et al. | 340/825.44 |
| 4,969,136 | 11/1990 | Chamberlin et al. | 369/29 |
| 5,122,795 | 6/1992 | Cubley et al. | 340/825.44 |
| 5,128,981 | 7/1992 | Tsukamoto et al. | 455/450 |
| 5,243,645 | 9/1993 | Bissell et al. | 379/211 |
| 5,327,486 | 7/1994 | Wolff et al. | 379/96 |
| 5,329,578 | 7/1994 | Brennan et al. | 455/461 |
| 5,416,473 | 5/1995 | Dulaney, III | 340/825.44 |
| 5,434,908 | 7/1995 | Klein | 379/88 |
| 5,473,671 | 12/1995 | Partridge, III | 455/445 |
| 5,475,380 | 12/1995 | Shim | 340/825.44 |
| 5,526,404 | 6/1996 | Wiedeman et al. | |
| 5,586,165 | 12/1996 | Wiedeman . | |
| 5,590,180 | 12/1996 | Tonomura et al. | 379/111 |
| 5,590,395 | 12/1996 | Diekelman . | |
| 5,594,740 | 1/1997 | LaDue . | |
| 5,594,780 | 1/1997 | Wiedeman et al. . | |
| 5,742,668 | 4/1998 | Pepe et al. | 455/461 |
| 5,742,905 | 4/1998 | Pepe et al. | 455/461 |

*Primary Examiner*—Paul Loomis
*Assistant Examiner*—Binh K. Tiey

[57] ABSTRACT

A subscriber enters personal information data into a personal information manager (PIM). The PIM, either automatically, or based on additional profile requests entered by the subscriber, generates profile update data associated with the personal information data. The PIM transmits the profile update data to a database in a telecommunication system which stores subscriber profile data. The transmission is via a wired communication link, a wireless communication link, or a combination of wired and wireless communication link. Upon receipt of the profile update data by the database, the subscriber profile data stored therein is updated in accordance with the subscriber profile update data. Thereafter, telecommunication services, including call completion services and message reminder services, are provided to the subscriber based on the updated subscriber profile data.

32 Claims, 11 Drawing Sheets

500

502

| TIME | DESCRIPTION | PROFILE REQUEST | |
|---|---|---|---|
| 8:00 AM | | | |
| 8:30 AM | | | |
| 9:00 AM | MEETING WITH JOHN IN ROOM 4A | CALL FORWARD TO VOICE MAIL | ⎫ |
| 9:30 AM | ↓ | ↓ | ⎪ |
| 10:00 AM | ↓ | ↓ | ⎬ 504 |
| 10:30 AM | ↓ | ↓ | ⎭ |
| 11:00 AM | | | |
| 11:30 AM | | | |
| 12:00 NOON | LUNCH | SELECTIVE CALL ACCEPTANCE(123) 555-6666 OTHER TO VOICE MAIL | ⎫ |
| 12:30 PM | ↓ | ↓ | ⎬ 506 |
| 1:00 PM | ↓ | ↓ | ⎭ |
| 1:30 PM | | | |
| 2:00 PM | | | |
| 2:30 PM | | | |
| 3:00 PM | | REMINDER MESSAGE "MEETING ROOM 2B" | } 508 |
| 3:30 PM | STAFF MEETING ROOM 2B | CALL FORWARD TO (123)444-5555 | ⎫ |
| 4:00 PM | ↓ | ↓ | ⎪ |
| 4:30 PM | ↓ | ↓ | ⎬ 510 |
| 5:00 PM | ↓ | ↓ | ⎪ |
| 5:30 PM | ↓ | ↓ | ⎭ |
| 6:00 PM | | | |

| MARCH 1, 1996 TIME (402) | DESCRIPTION (404) |
|---|---|
| 8:00 AM | |
| 8:30 AM | |
| 9:00 AM | MEETING WITH JOHN IN ROOM 4A |
| 9:30 AM | ↓ |
| 10:00 AM | ↓ |
| 10:30 AM | ↓ |
| 11:00 AM | |
| 11:30 AM | |
| 12:00 NOON | LUNCH |
| 12:30 PM | ↓ |
| 1:00 PM | ↓ |
| 1:30 PM | |
| 2:00 PM | |
| 2:30 PM | |
| 3:00 PM | |
| 3:30 PM | STAFF MEETING ROOM 2B |
| 4:00 PM | ↓ |
| 4:30 PM | ↓ |
| 5:00 PM | ↓ |
| 5:30 PM | ↓ |
| 6:00 PM | |

| TIME | DESCRIPTION | PROFILE REQUEST | |
|---|---|---|---|
| 8:00 AM | | | |
| 8:30 AM | | | |
| 9:00 AM | MEETING WITH JOHN IN ROOM 4A | CALL FORWARD TO VOICE MAIL | ⎫ |
| 9:30 AM | ↓ | ↓ | ⎬ 504 |
| 10:00 AM | ↓ | ↓ | |
| 10:30 AM | ↓ | ↓ | ⎭ |
| 11:00 AM | | | |
| 11:30 AM | | | |
| 12:00 NOON | LUNCH | SELECTIVE CALL ACCEPTANCE(123) 555-6666 OTHER TO VOICE MAIL | ⎫ |
| 12:30 PM | ↓ | ↓ | ⎬ 506 |
| 1:00 PM | ↓ | ↓ | ⎭ |
| 1:30 PM | | | |
| 2:00 PM | | | |
| 2:30 PM | | | |
| 3:00 PM | | REMINDER MESSAGE "MEETING ROOM 2B" | } 508 |
| 3:30 PM | STAFF MEETING ROOM 2B | CALL FORWARD TO (123)444-5555 | ⎫ |
| 4:00 PM | ↓ | ↓ | |
| 4:30 PM | ↓ | ↓ | ⎬ 510 |
| 5:00 PM | ↓ | ↓ | |
| 5:30 PM | ↓ | ↓ | |
| 6:00 PM | | | ⎭ |

| | |
|---|---|
| 602 { | MIN: (123)-456-789 |
| | ESN: 998877665544 |
| 604 | FEATURE-1: INVOKE CALL-FORWARD (VOICE-MAIL)<br>START: 3/1/96; 9:30 AM<br>END: 3/1/96; 11:00 AM |
| 606 | FEATURE-2: INVOKE SELECTIVE-CALL-ACCEPTANCE<br>(123)555-6666 OTHER (VOICE MAIL)<br>START: 3/1/96; 12:00 NOON<br>END: 3/1/96; 1:00 PM |
| 608 | FEATURE-3: INVOKE ALERT-MSG("MEETING ROOM 2B")<br>START: 3/1/96; 3:00 PM<br>END: N/A |
| 610 | FEATURE-4: INVOKE CALL-FORWARD (123)444-5555<br>START: 3/1/96; 3:30 PM<br>END: 3/1/96; 5:30 PM |

| NAME | ADDRESS | TELEPHONE NUMBER |
|---|---|---|
|  |  |  |
| GOODWIN, ROBERT | 449 RIVER STREET | (494) 494-3924 |
| JONES, MARY | 456 1st STREET | (465) 494-5835 |
| MUNN, MICHAEL | 344 WASHINGTON BLDV. | (321) 456-4564 |
| SMITH, JOHN | 123 MAIN STREET | (345) 341-3483 |
| SOGRAY, SUSAN | 9 5th AVE. | (484) 939-0008 |

1102 → JONES, MARY row

PERSONAL INFORMATION MANAGER FOR UPDATING A TELECOMMUNICATION SUBSCRIBER PROFILE

This application is related to U.S. patent application entitled "Method and Apparatus for Providing Telecommunication Services Based on a Subscriber Profile Updated by a Personal Information Manger" (attorney docket Buhrmann 3-2), filed on even date herewith by the same inventors, and having a common assignee.

FIELD OF THE INVENTION

This invention relates generally to personal information managers. In particular, this invention relates to a personal information manager for updating a telecommunication subscriber profile based on information entered into the personal information manager.

BACKGROUND OF THE INVENTION

In an increasingly mobile society, telecommunications service providers are offering many different types of telecommunication services to their customers. With the increasing popularity of wireless communication systems (i.e. wireless cellular telephone systems, wireless cellular personal communication systems (PCS), or paging systems), such services allow users of wireless communication devices (e.g. mobile telephones, mobile data devices, or paging receivers) to manage their availability for communication. Such services are generally provided to users on a subscription basis, and therefore these users are often referred to as subscribers.

One category of telecommunication services is call completion services. Call completion refers to the manner in which a call to a subscriber is processed by the telecommunication system. Call completion services are particularly important in a wireless communication system. Subscribers, while valuing the ability to be reached via a mobile telephone, recognize that there may be certain times (e.g. during meetings) when they do not want to be interrupted by a telephone call.

One type of call completion service is call forwarding, in which telephone calls to a subscriber are forwarded to an alternate destination at certain times. Such alternate destination may be, for example, a secretary, voice mail, or another telephone. Thus, if a caller places a call to the mobile telephone of a subscriber who has call forwarding activated, the call will be automatically routed to the alternate destination.

Another type of call completion service is selective call acceptance, in which only calls from certain telephone numbers are routed to a subscriber telephone during certain times. For example, if a subscriber is in a meeting, he/she may set up selective call acceptance to route all calls, except those from his/her secretary, to voice mail.

Another category of telecommunication services is paging alert reminder service. This service provides subscribers with paging alert messages in order to remind the subscriber of a timed event. For example, U.S. Pat. No. 5,122,795 describes a nationwide paging system which interconnects existing local paging services. The system includes an automatic page generator which maintains a list of events that cause pages to be generated for a particular subscriber. One type of automatic page is a time initiated page, which is broadcast at a specific time (e.g. wake-up calls, birthday notices, reminders to take medication, etc.). When the event time occurs, the page generator sends a page for distribution to the appropriate local paging service for broadcast.

Also related to paging messages is U.S. Pat. No. 5,416,473, which is directed to a calendar driven messaging system. It describes an electronic information processing device (e.g. pocket paging assistant, personal computer, electronic pocket organizer, laptop computer, or the like) which communicates with a paging terminal via a conventional modem for automatically sending pre-stored messages to a paging subscriber as reminders for meetings, appointments, or the like. A user enters a message, a time at which the message is to be transmitted, and an identification of a paging subscriber, into the electronic information processing device. The information is stored in a memory of the electronic information processing device until the indicated time occurs. At the indicated time, the electronic information processing device communicates the message to a paging terminal for delivery to the pager associated with the identified subscriber. Thus, the electronic information processing device may be used as a reminder system to notify paging subscribers of timed events. The electronic information processing device is external to the paging system, and communicates with the paging system via a modem. Since the electronic information processing device is not part of the telecommunications network, and does not send messages to the telecommunications network until the alert time has arrived, the electronic information processing device must be continually dedicated to the task of scanning for messages which need to be sent. Further, as a result of being external to the paging system, the electronic information processing device must have continuous access to a phone line in order to communicate a message to the paging system.

In order for a telecommunication service provider to provide individualized telecommunication services (e.g., call completion services and paging alert reminder service) to subscribers, individual subscriber profiles must be stored in a database in the telecommunication network. Such subscriber profiles describe, for each subscriber, the telecommunication service features which the subscriber subscribes to, and the current status of the feature (e.g. active or inactive). In addition, the subscriber profile describes feature descriptions which may be unique for each subscriber so as to allow each subscriber to have a customizable set of telecommunication service features.

The problem arises as to how to enter information into a subscriber profile and how to keep a subscriber profile up to date to reflect a subscriber's changing schedule. One method for entering and updating a subscriber profile is for a subscriber to place a telephone call to a processing system which updates the subscriber profile. The processing system may be automated, such that the subscriber updates his/her profile based on commands entered via the telephone keypad. Alternatively, the processing system may be monitored by an attendant, whereby the subscriber conveys his/her profile requests to the attendant and the attendant updates the subscriber profile in the database. One of the drawbacks to such a system is that a subscriber must remember to call in to the processing system when an update to the profile is to be made. Further, the possibility of the subscriber making a data entry error when using the automated system is another drawback to the system.

One automated technique for updating a database containing subscriber information is described in U.S. Pat. No. 5,243,645, which describes an automatic system for forwarding calls. In that system, a subscriber's call forwarding profile is updated based on transactions or activities that indicate the subscriber's location. From the subscriber point of view, these activities are ones which are engaged in for reasons unrelated to call forwarding (e.g. using a credit card or placing a long distance credit card call). An advantage of such a system is that a subscriber's call forwarding profile is updated without any extra effort by the subscriber. A drawback to this system is that call forwarding information is updated only after a subscriber engages in an appropriate activity while at a location. If the user does not engage in such an activity, then the user's call forwarding profile is not updated.

U.S. Pat. No. 5,434,908 describes a system for automatically managing the greetings for a subscriber's voice message system based on information contained in the subscriber's electronic schedule database (e.g. calendar management program database stored in a computer). In accordance with this system, a computer connected to a voice mail system and having access to the electronic schedule database executes a special process. The process periodically checks the subscriber's electronic schedule database and determines if the subscriber's voice mail message needs to be updated. If the voice mail message needs to be updated, the process generates a new message and sends the message to the voice message system. A deficiency of such a system is that, since the computer is not an integral part of the voice message system, and does not generate and send a new message to the voice message system until a scheduled event time is encountered, the computer must be continually dedicated to the task of scanning for scheduled event times which require generation of a message. Further, as a result of not being an integral part of the voice message system, the computer must have continuous access to the voice mail system in order to communicate a generated voice message to the voice message system. Further, the system does not affect call processing (e.g., call routing) based on entries in the electronic schedule database. The routing of the call to the voice message system is not based on information contained in the subscriber's electronic schedule database. The information contained in the subscriber's electronic schedule database only affects the voice mail message heard by a caller after the call is routed to the voice mail system.

SUMMARY OF THE INVENTION

A personal information manager (PIM) for updating a telecommunication subscriber profile based on subscriber personal information data entered into the PIM.

A subscriber enters personal information data into a PIM. Such personal information data comprises schedule data describing timed events (e.g. meeting times, appointments, etc.) and contact data describing user contacts (e.g., name, address, phone number, etc.). Based on the personal information data, the PIM generates profile update data which is transmitted to a telecommunications network node at which subscriber profile data is stored.

In one embodiment, the subscriber is presented with a user interface for entry of profile requests in conjunction with each of the timed events. Thus, for each of the timed events, the subscriber may request that the subscriber's profile be updated in a particular manner. Such profile requests include call completion requests, in which a subscriber requests that calls placed to a communication device associated with the subscriber be routed in a particular way, and alert requests, in which a subscriber requests that a reminder message be scheduled to be sent to a communication device associated with the subscriber in conjunction with a timed event. Upon entry of the profile requests by the subscriber, the PIM transmits profile update data, based on the profile request data, to a telecommunication network node at which subscriber profile data is stored. The profile update data includes call completion update data, corresponding to the call completion requests, and alert update data, corresponding to the alert requests.

In an alternate embodiment, instead of the subscriber entering profile requests into the PIM, the PIM automatically generates the profile update data based on the schedule information describing timed events entered by the subscriber. In such an embodiment, the subscriber may enter default information indicating the type of profile update data which is to be generated for different types of schedule information. For example, the default information may indicate that all calls to the subscriber during scheduled meetings are to be routed to voice mail. In such an example, the PIM will automatically generate call completion update data for scheduled meetings. Similarly, the default information may indicate that a reminder message is to be sent to the subscriber as a reminder for all meetings. In such an example, the PIM will automatically generate alert update data for scheduled meetings.

In accordance with another aspect of the invention, call completion update data is generated based on the contact data representing user contacts. The user enters a call completion request associated with a user contact. The PIM generates profile update data, including call completion update data, based on the call completion request and transmits the profile update data to a telecommunications network node at which the subscriber profile data is stored in a database.

The transmission of profile update data from the PIM to the database in the telecommunication system may be via a wireless communication link, a wired communication link, or a combination of wired and wireless communication links. Upon receipt of the profile update data at the database, the subscriber profile data is updated accordingly.

Thus, in accordance with the present invention, the subscriber's PIM updates the subscriber's profile in the telecommunication network based on subscriber personal information data. In this manner, the subscriber's telecommunication profile closely corresponds to the subscriber's actual schedule and the updating of the subscriber's telecommunication profile is closely integrated with the subscriber's PIM scheduling and contact management mechanism.

These and other advantages of the invention will be apparent to those of ordinary skill in the art by reference to the following detailed description and the accompanying drawings.

BRIEF DESCRIPTION OF THE DRAWINGS

FIG. 4 shows an example PIM schedule display.

FIG. 5 shows an example PIM schedule display with an added profile request field.

FIG. 6 shows an example subscriber profile record.

FIG. 11 shows an example PIM contact manager display.

DETAILED DESCRIPTION

Figure 1:
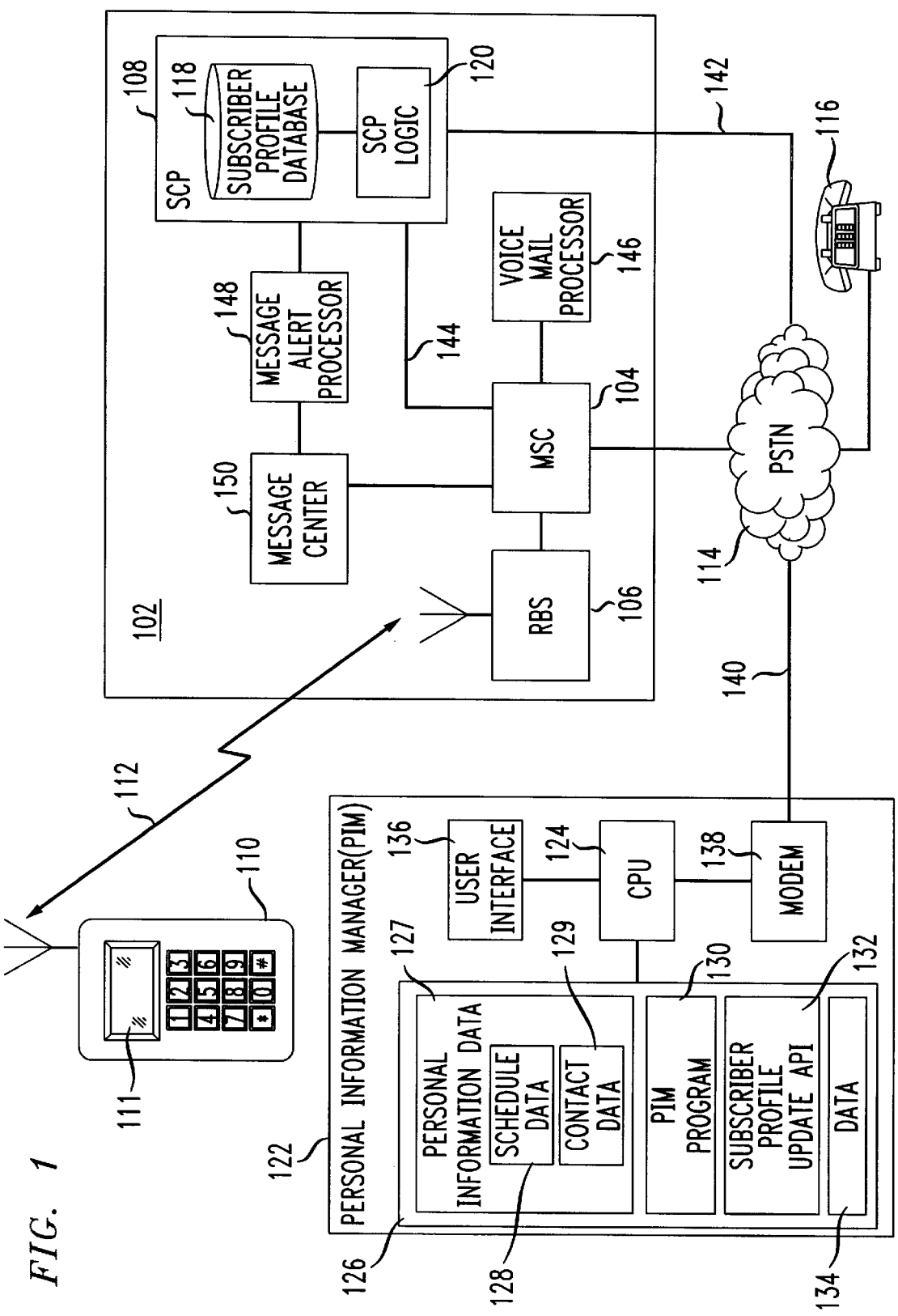
FIG. 1 shows a system for updating a telecommunication subscriber profile via a wired communication link and for providing telecommunication services based on the updated subscriber profile.

A system for updating a telecommunication subscriber profile and for providing telecommunication services based on the updated subscriber profile is shown in FIG. 1. A wireless cellular communication network 102 includes a mobile switching center (MSC) 104, a radio base station (RBS) 106, a service control point (SCP) 108, a voice mail processor 146, a message center 150, and a message alert processor 148. A mobile station 110 is shown communicating with the RBS 106 via a radio communication link 112. The mobile station 110 is shown here as a mobile telephone. A suitable mobile station 110 may be a telephone capable of operating in accordance with *TIA/EIA Interim Standard IS*-137, *800 MHz TDM Cellular—Radio Interface— Minimum Performance Standards for Mobile Stations,* December 1994, Telecommunications Industry Association, which is incorporated herein by reference, such that in addition to receiving and transmitting voice, the telephone is capable of receiving short message service (SMS) messages. Of course, other types of telephones may also be used (e.g. code division multiple access (CDMA) or Groupe Specialle Mobile (GSM)). SMS messages are short text messages which are transmitted to the telephone via the wireless cellular communication network 102. Upon receipt by the telephone, the SMS message is displayed in the visual display area 111 of the telephone. Such SMS messaging is well known and is described in further detail in *TIA/EIA Interim Standard IS*-136.1, *800 MHz TDMA Cellular— Radio Interface—Mobile Station—Base Station Compatibility—Digital Control Channel,* Rev. 0, May 17, 1995, Telecommunications Industry Association, which is incorporated herein by reference. It is to be noted that although the mobile station 110 is described herein as a mobile telephone, the mobile station 110 may be another type of wireless communication device.

As is well known in the art of wireless communications, a wireless cellular communication network 102 comprises a plurality of radio base stations, such as RBS 106, each of which serves a geographic area, or cell. Only one RBS 106 is shown in FIG. 1 for clarity. RBS 106 is connected to MSC 104 which controls the functioning of the RBS 106. The MSC 104 is also connected to the public switched telephone network (PSTN) 114, which allows mobile station 110 to communicate with land line stations, such as telephone 116. The MSC 104 is also connected to the SCP 108, the voice mail processor 146, and the message center 150. The SCP 108 contains a database 118 which contains subscriber profiles. The functioning of the SCP is controlled by SCP logic 120. SCP logic 120 may be a computer processor executing stored program instructions in a manner which is well known in the art. Alternatively, SCP logic 120 may be circuitry for carrying out the SCP logic 120 functions. The functioning of the SCP logic 120 will be discussed in further detail below. The configuration of a wireless cellular communication network 102 is well known in the art, and the details of such a network will not be discussed herein. For further information on wireless cellular communication networks, see Neil L. Boucher, *Cellular Radio Handbook,* 3rd Edition, Quantum Publishing, Mill Valley, Calif., 1995, which is incorporated by reference herein.

Figure 2:
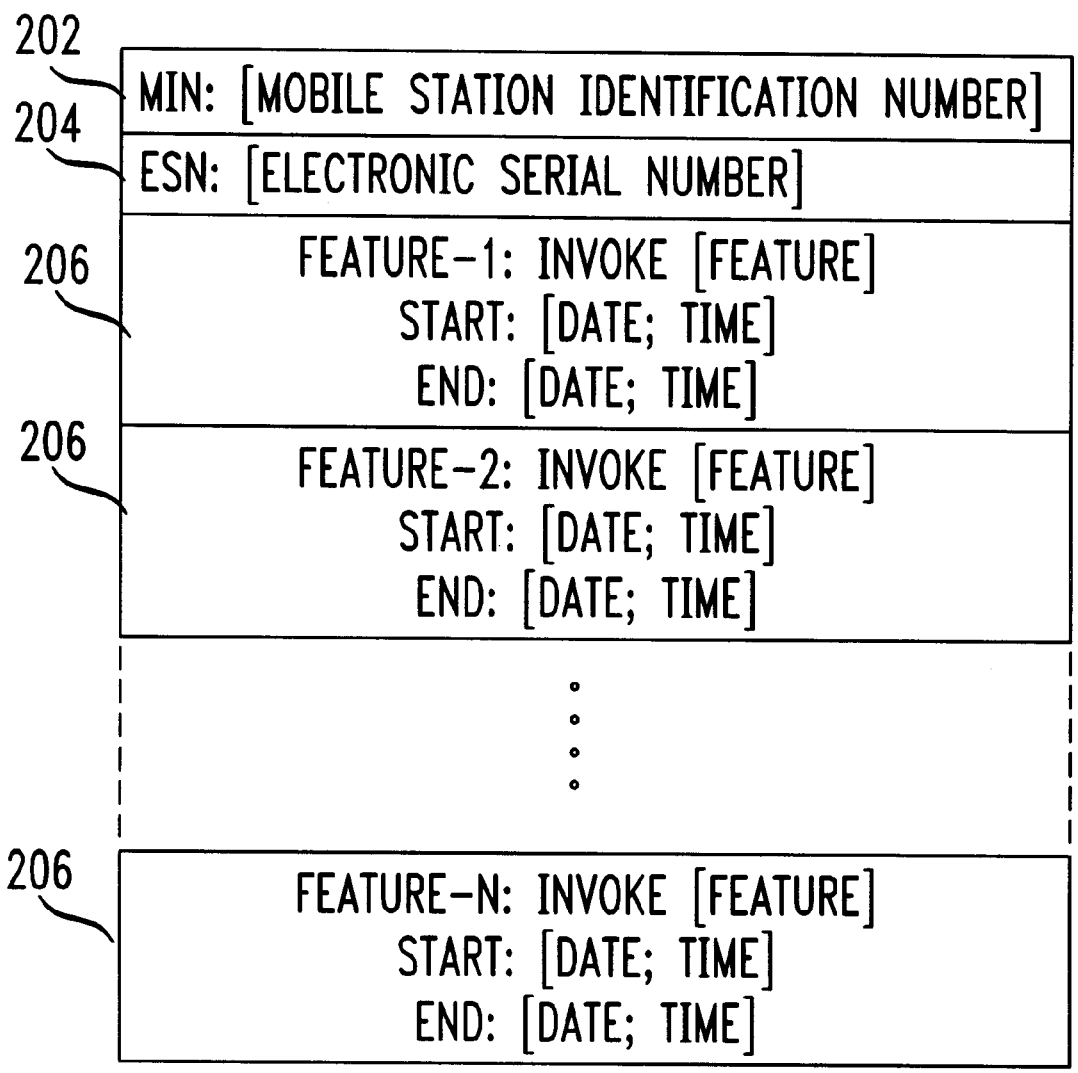
FIG. 2 shows the structure of a subscriber profile record.

As discussed above, telecommunication service providers are offering many different types of telecommunication services to subscribers in order to aid subscribers in managing their mobile communications. The services to which each subscriber subscribes, and the setup details for each of those services, is stored in a subscriber profile database 118. The subscriber profile database 118 contains a database record for each subscriber describing the subscriber's profile. The structure of a subscriber profile record is shown as 200 in FIG. 2. The first entry 202 in the record contains the Mobile Station Identification Number (MIN), of the subscriber mobile station. Where the mobile station is a mobile telephone, the MIN is the telephone number of the telephone. The second entry 204 in the record contains the unique electronic serial number (ESN) of the mobile station. The combination of the MIN and the ESN provide an index into the database 118 and identify a unique subscriber profile record for a particular subscriber and associated mobile station. The subscriber profile record also contains feature entries 206, which specify the service features for the subscriber and associated mobile station identified by the MIN and ESN. Each feature entry 206 specifies a feature and the time frame during which the feature is active. The time entries shown in the feature entries 206 specify a start date/time and an end date/time. These time entries may be specific, such that the feature will be active from a certain start date/time until a certain end date/time. Alternatively, the end date/time may specify an indefinite date/time, such that the feature will be active until the subscriber profile record is updated. The structure and elements of a subscriber profile record may vary depending on the particular implementation. The structure shown in FIG. 2 is exemplary of the structure of such a record.

The subscriber profile record of a particular subscriber is updated in the database 118 via a personal information manager (PIM), such as PIM 122 (FIG. 1). As used herein, a PIM is any type of electronic personal information device. For example, and without limitation, a PIM may be a program executing on a personal computer (e.g. Now Up-To-Date available from Now Software, Inc., Portland Oreg.), a hand-held personal information device (e.g. a Casio Digital Diary), or a personal digital assistant (e.g. Apple Newton). In general, and as shown in FIG. 1, a suitable PIM 122 includes a central processing unit (CPU) 124 connected to a memory 126, a user interface 136, and a modem 138. The memory 126 contains storage areas for storing personal information data 127, a PIM program 130, a subscriber profile update application program interface (API) 132, and other data 134. The personal information data 127 comprises schedule data 128 and contact data 129.

Memory unit 126 may be any type of machine readable storage device. For example, and without limitation, memory unit 126 may be a random access memory (RAM), a read only memory (ROM), a programmable read only memory (PROM), an erasable programmable read only memory (EPROM), an electronically erasable programmable read only memory (EEPROM), a magnetic storage media (i.e. a magnetic disk), or an optical storage media (i.e. a CD-ROM). Further, the PIM 122 may contain various combinations of machine readable storage devices, which are accessible by the CPU 124, and which are capable of storing a combination of computer program code and data.

The CPU 124 executes the computer program instructions of the PIM program 130, in order to carry out the personal information management functions of the PIM 122. Such functions include personal scheduling functions and contact management functions. Such personal information management functions are well known in the art. The schedule data 128 contains information about the user's schedule. The contact data 129 contains contact information such as name, address, telephone numbers, fax numbers, etc. about the user's contacts. The subscriber profile update API 132 is a computer program which allows the PIM 122 to interface with the subscriber profile database 118 of the wireless cellular communication network 102. Further details of the subscriber profile update API 132 will be described below. The CPU 124 is also connected to a user interface 136, which allows for subscriber interaction with the PIM. Such a user interface 136 may be, for example, a display monitor, printer, mouse, keyboard, light pen, touch pad, or the like. Further, user interface 136 may include a combination of such devices. The user interface 136 allows the subscriber who is using the PIM 122 to view, enter and update personal information data 127 and otherwise interact with the PIM 122. The modem 138 is used for sending information from the PIM 122 to the SCP 108 through the PSTN 114. The use of a modem for communication with external devices is well known and will not be described in detail herein.

Figure 3:
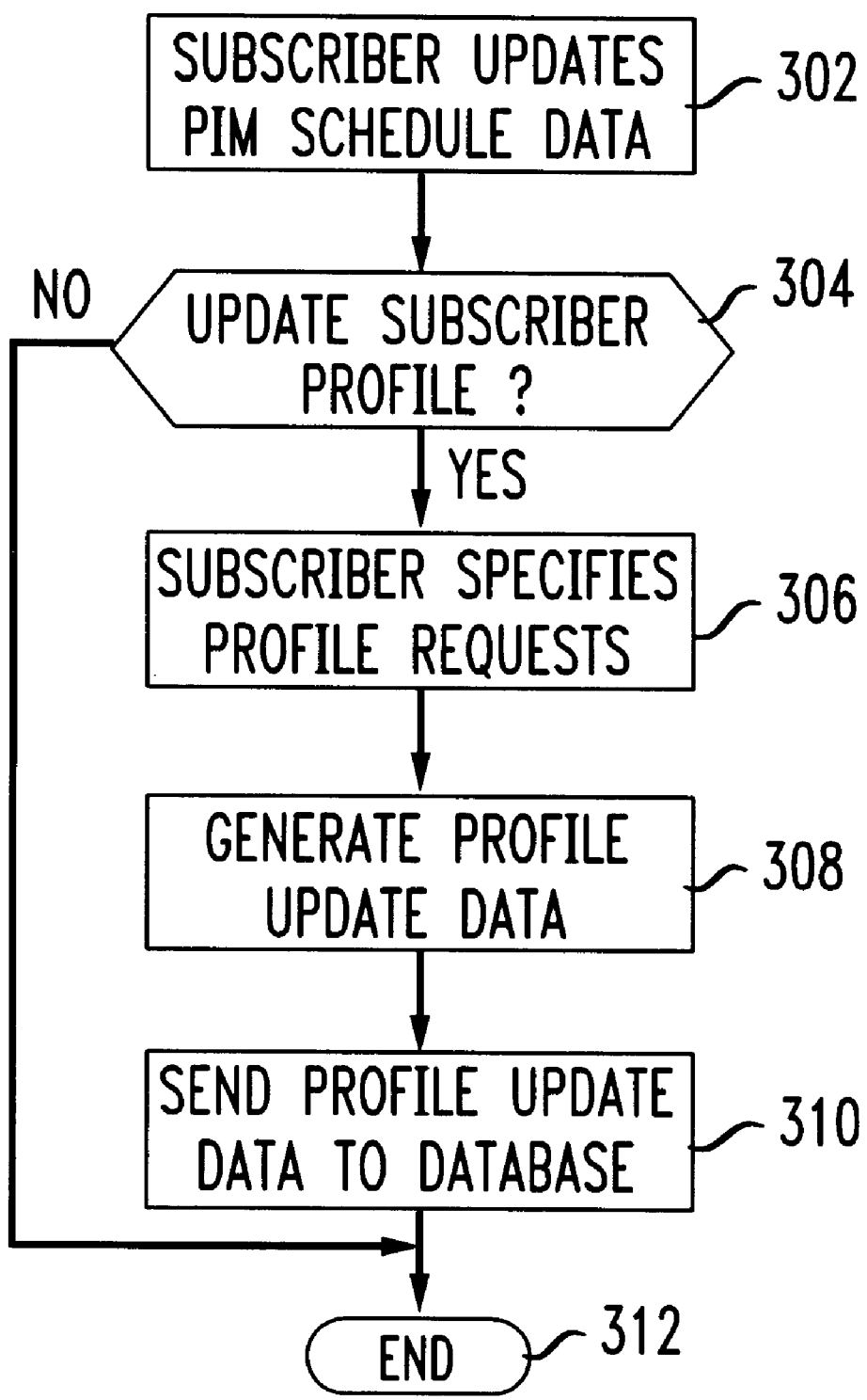
FIG. 3 is a flowchart of the steps of generating profile update data for use in updating the subscriber profile database.

The steps of generating profile update data, based on schedule data, for use in updating the subscriber profile database 118 will be described in conjunction with the flowchart of FIG. 3. For purposes of the example described below, it is assumed that the user of PIM 122 is the subscriber associated with mobile station 110. Thus, subscriber profile updates initiated by the user using PIM 122 will affect call processing and alert messages for mobile station 110. In step 302, the subscriber updates the schedule data 128 via the user interface 136. Such an update step may be performed in various ways, depending on the particular PIM implementation. In general, the subscriber is provided with a schedule display for a chosen day via the user interface 136. An example schedule display 400 is shown in FIG. 4. Assume for this example that the schedule is shown for Mar. 1, 1996. The subscriber enters schedule data into the description field 404 to indicate timed events to occur at the times indicated in the time field 402. For example, as shown in FIG. 4, the subscriber has entered data indicating a meeting with John in room 4A from 9:00 AM to 10:30 AM; lunch from 12:00 Noon to 1:00 PM; and a staff meeting in room 2B from 3:30 PM to 5:30 PM. Upon the entry of the data via the user interface 136, the entered data is stored as schedule data 128 in memory 126 of PIM 122. Of course, there are many different ways for the PIM 122 to handle the entry of schedule data 128 into memory 126 by the subscriber via a user interface 136, and the procedure will depend on the particular scheduling program 130 controlling the PIM 122. The data entry mechanism described herein in conjunction with FIG. 4 is for example purposes only.

In one embodiment, upon entry of schedule data 128 by the subscriber in step 302, the subscriber is queried by the PIM 122 as to whether the subscriber would like to update his/her telecommunication subscriber profile based on the PIM entries. This query is represented in the flowchart of FIG. 3 as step 304. If the subscriber answers "NO" to this query, then the subscriber profile is not updated and the procedure ends in step 312. If the subscriber answers "YES" to this query, then in step 306 the subscriber enters profile requests into the PIM 122. The entry of profile requests is controlled by the subscriber profile update (API) 132. Alternatively, the entry of profile requests may be controlled by the scheduling program 130. The subscriber profile update (API) 132 is program code which works in conjunction with the scheduling program 130 of the PIM 122 in order to provide the subscriber profile update functions in accordance with the present invention. The subscriber is presented, through the user interface 136, with a display 500 (FIG. 5) allowing entry of profile requests in a profile request field 502. The profile request field 502 is added to the conventional scheduling display 400 presented by the PIM 122 in step 302. One type of profile request is a call completion request in which the subscriber requests a call completion service (e.g., call forwarding) to be activated. Another type of profile request is a user alert request, in which the subscriber requests an alert message service to be activated.

Assume the subscriber enters profile requests in the profile request field 502 as follows. Entry 504 is a call completion request indicating that from 9:00 AM until 10:30 AM, during the meeting with John in room 4A, all calls to the subscriber mobile station 110 are to be forwarded to the subscriber's voice mail. Entry 506 is a call completion request indicating that during lunch, from 12:00 Noon until 1:00 PM, the subscriber requests selective call acceptance such that only calls from the telephone number (123) 555-6666[1] will be delivered to the subscriber's mobile station 110. All other calls will be forwarded to subscriber's voice mail. Entry 508 is an alert request indicating that the subscriber requests a reminder message, "meeting room 2B", to be generated at 3:00 PM and sent to the mobile station 110. Entry 510 is a call completion request indicating that from 3:30 PM until 5:30 PM, corresponding to the staff meeting in room 2B, the subscriber requests that all calls to mobile station 110 be forwarded to telephone number (123) 444-5555.

Telephone numbers are used herein for example purposes only. There is no significance to the use of any particular telephone number other than for exemplification of the present invention. No reference to actual telephone numbers is intended.

After the subscriber enters and confirms the profile requests entered in the profile request field 502, the PIM 122 generates profile update data appropriate for updating the subscriber profile database 118 in step 308. The generated profile update data is based on the profile requests entered by the subscriber in the profile request field 502. The generation of profile update data is controlled by the subscriber profile update API 132. This profile update data includes both call completion update data (from profile requests 504, 506, 510) and alert update data (from profile request 508). In one embodiment, the profile update data is in the form of a Transaction Capability Application Part (TCAP) message. TCAP messages are well known in the art of telecommunication networks and are described in further detail in ANSI 1988, Signaling System No. 7 (SS7)—Transaction Capability Application Part (TCAP), ANSI T1.114-1988, which is incorporated herein by reference.

In an alternate embodiment, instead of the subscriber entering profile requests in step 306 and basing the generation of profile update data (step 308) on the profile requests entered by the subscriber, the PIM 122 could be configured, through the subscriber profile update API 132, to automatically generate profile update data based on the schedule data 128 entered by the subscriber in step 302. In such an embodiment, the subscriber may store default information as data 134 in memory 126. For example, the user may store default information indicating that whenever a meeting is scheduled in schedule data 128, the PIM 122 should automatically generate call completion update data specifying that all calls during that time be forwarded to voice mail. Further, the default information could indicate that whenever a meeting is scheduled in schedule data 128, the PIM 122 should automatically generate alert update data specifying that an alert message be sent to the mobile station 110 at a predetermined time before the scheduled meeting. Of course, various types of default information may be stored by the subscriber in order to customize the generated profile update data. Further, the subscriber could override the automatically generated profile update data for any particular schedule event. Thus, in accordance with this embodiment, steps 304 and 306, would not be performed. Instead, in step 308, the profile update data will be generated automatically based on the schedule data 128 entered by the user in step 302.

Upon completion of step 308, the PIM 122 transmits the profile update data to the wireless cellular communication network 102 in step 310. The profile update data, which is in the TCAP message format, is transmitted to the SCP 108 via modem 138, link 140, PSTN 114, and link 142. Links 140 and 142 may be standard telephone links. SCP logic 120 is configured to recognize the received TCAP message as profile update data and to update the appropriate subscriber profile record in database 118. Assuming that no other subscriber profile data was stored in a subscriber profile record for the subscriber associated with mobile station 110, the subscriber profile record in database 118 after step 310 would be the record 600 shown in FIG. 6.

The header 602 of the record contains the MIN ((123) 456-789) and ESN (998877665544) of the mobile station 110 associated with the subscriber. Feature entry 604 of record 600 is subscriber call completion data specifying that call forwarding to voice mail be invoked from 9:30 AM until 11:00 AM on Mar. 1, 1996. This subscriber call completion data corresponds to the entry 504 in the profile request field 502 entered by the subscriber during step 306. Feature entry 606 of record 600 is subscriber call completion data specifying that selective call acceptance for phone number (123)555-6666) be invoked from 12:00 Noon until 1:00 PM on Mar. 1, 1996. Calls from other phone numbers are to be directed to voice mail. This subscriber call completion data corresponds to the entry 506 in the profile request field 502 entered by the subscriber during step 306. Feature entry 608 of record 600 is subscriber alert data specifying that the message "meeting room 2B" be sent to the mobile station 110 at 3:00 PM on Mar. 1, 1996. This subscriber alert data corresponds to the entry 508 in the profile request field 502 entered by the subscriber during step 306. Feature entry 611 of record 600 is subscriber call completion data specifying that call forwarding to the phone number (123) 444-5555 be invoked from 3:30 PM until 5:30 PM on Mar. 1, 1996. This subscriber call completion data corresponds to the entry 510 in the profile request field 502 entered by the subscriber during step 306.

The procedure ends in step 312. Thus, in the manner described above in conjunction with FIG. 3, subscriber profile data stored in database 118 of the wireless cellular communication network 102 is updated as a result of entries made by the subscriber in PIM 122. The subscriber profile record 600 described above is only one example of how subscriber profile data (including subscriber call completion data and subscriber alert data) may be stored in database 118. Other data organization techniques may be used to store the subscriber profile data in database 118.

As described above, profile update data may be generated based on schedule data 128 stored in PIM 122. Additionally, profile update data may be generated based on contact data 129 as follows. As described above, contact data 129 contains data such as name, address, and telephone number for user contacts. In order to view such contact data 129, the user is presented, through user interface 136, with a display 100 (FIG. 11) which lists all, or part, of the contact data 129. As shown in FIG. 11, the display 1100 contains names with associated addresses and telephone numbers. A subscriber could use such a PIM display to request an update to the subscriber's profile. For example, assume the subscriber is entering a meeting but is waiting for an important call from Mary Jones. Thus, the subscriber wants all calls to be forwarded to voice mail, except for a call from Mary Jones' phone number, which is to be delivered to the subscriber's mobile station 110. The subscriber would select (e.g. by using a mouse) entry 1102 in display 1100. The subscriber would then indicate a call completion request (e.g., selective call acceptance) for the selected entry 1102, and the subscriber would also indicate the start and end time that the call completion request is to be active. Such an indication may be made, for example, through a PIM command using a pull down menu. Of course, there are many variations on how the subscriber may select a name from the display 1100 and enter a call completion request, depending on the particular PIM implementation. Upon confirmation of the request, the PIM 122, under control of the PIM program 130 and the subscriber profile update API 132, generates profile update data, containing call completion update data, and sends the profile update data to the wireless cellular communication network 102. The steps of generating the profile update data and sending the profile update data to the wireless cellular communication network 102 are similar to steps 308 and 310 described above in conjunction with FIG. 3. In this example, upon receipt of the profile update data, the subscriber profile record in database 118 would be updated to contain a feature entry containing subscriber call completion data specifying that selective call acceptance for phone number (465) 493-5835 be invoked during a particular time, and that calls from other phone numbers are to be directed to voice mail. Such a feature entry would be similar to feature entry 606 of record 600 described above in conjunction with FIG. 6. Thus, in accordance with this aspect of the invention, contact data 129 which is stored as personal information data 127 in memory 126 of the PIM 122 is used to allow a user to request that call completion feature updates be made to the user's subscriber profile in the wireless cellular communication network 102.

Figure 7:
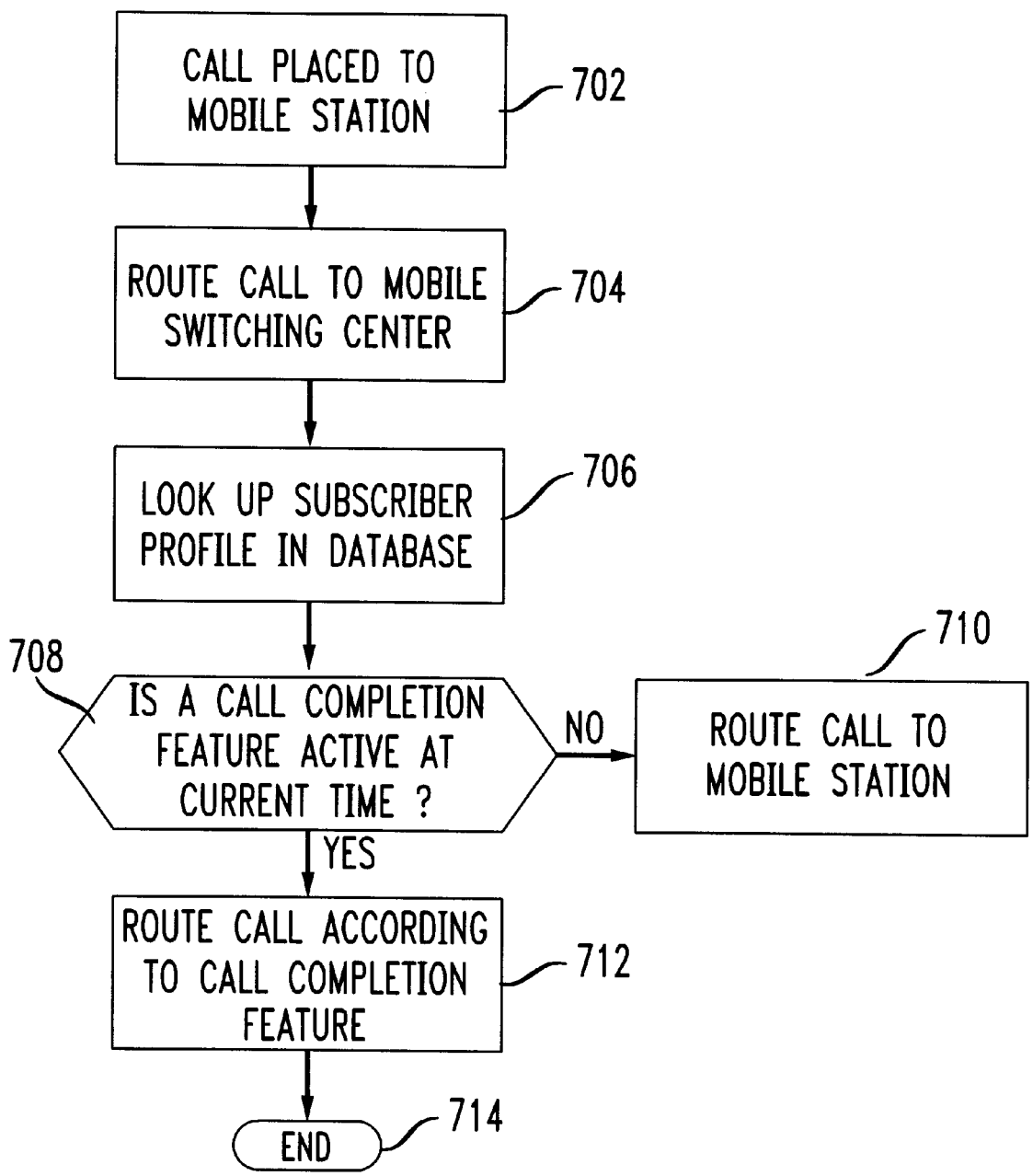
FIG. 7 is a flowchart of the steps performed for processing a call in accordance with an updated subscriber profile.

Call processing in accordance with the updated subscriber profile will now be described in conjunction with the flowchart of FIG. 7. In step 702 a call is placed from landline telephone 116 to mobile station 110. In step 704, the call is routed through the PSTN 114 to the MSC 104. It is noted that the routing of calls from a landline telephone to a wireless cellular communications network is well known in the art. In step 706 the MSC 104 sends a query to database 118 via link 144 requesting the subscriber profile record of the subscriber associated with mobile station 110. The SCP logic 120 is configured to receive the request, retrieve the subscriber profile record 600 from the database 118, and send the subscriber profile record 600 containing the subscriber profile data to the MSC 104. As described above, the subscriber profile record 600 includes both subscriber call completion data (entries 604, 606, 610) and subscriber alert data (entry 608).

In step 708 it is determined whether a call completion feature is active at the time of the call. If a call completion feature is active, then in step 712 the call is routed in accordance with the active call completion feature. If a call completion feature is not active, then in step 710 the call is routed to the mobile station 110 via RBS 106 and communication link 112. It is noted that the routing of a call from a MSC to a mobile station is well known. The procedure ends in step 714.

As an example, consider a call placed from telephone 116 (having a telephone number of (123) 888-8888) to mobile station 110 at 12:30 PM on Mar. 1, 1996. Upon receipt of the call the MSC 104 will request the subscriber profile record associated with mobile station 110 from database 118. Upon receipt of subscriber profile record 600, the MSC 104 will determine that FEATURE-2 606 is active. In accordance with FEATURE –2, only calls from telephone number (123) 555-6666 will be accepted between 12:00 Noon and 1:00 PM. All other calls will be routed to the subscriber's voice mail. The telephone number of the calling telephone 106, called the ANI, is provided to the MSC 104 by the PSTN 114 during routing of the call in a manner which is well known in the art. Thus, the MSC 104 determines that the ANI is not to be accepted by the mobile station 110 at this time, and the call is routed to a voice mail processor 146, where the caller from telephone 116 can leave a message for the subscriber. Alternatively, if the telephone number of telephone 116 was (123) 555-6666, then the call would be routed to mobile station 110.

Call processing in connection with the remaining call completion feature entries (604, 610) in subscriber profile record 600, would be clear to one skilled in the art given the above description, and such call processing will not be discussed in further detail herein.

Figure 8:
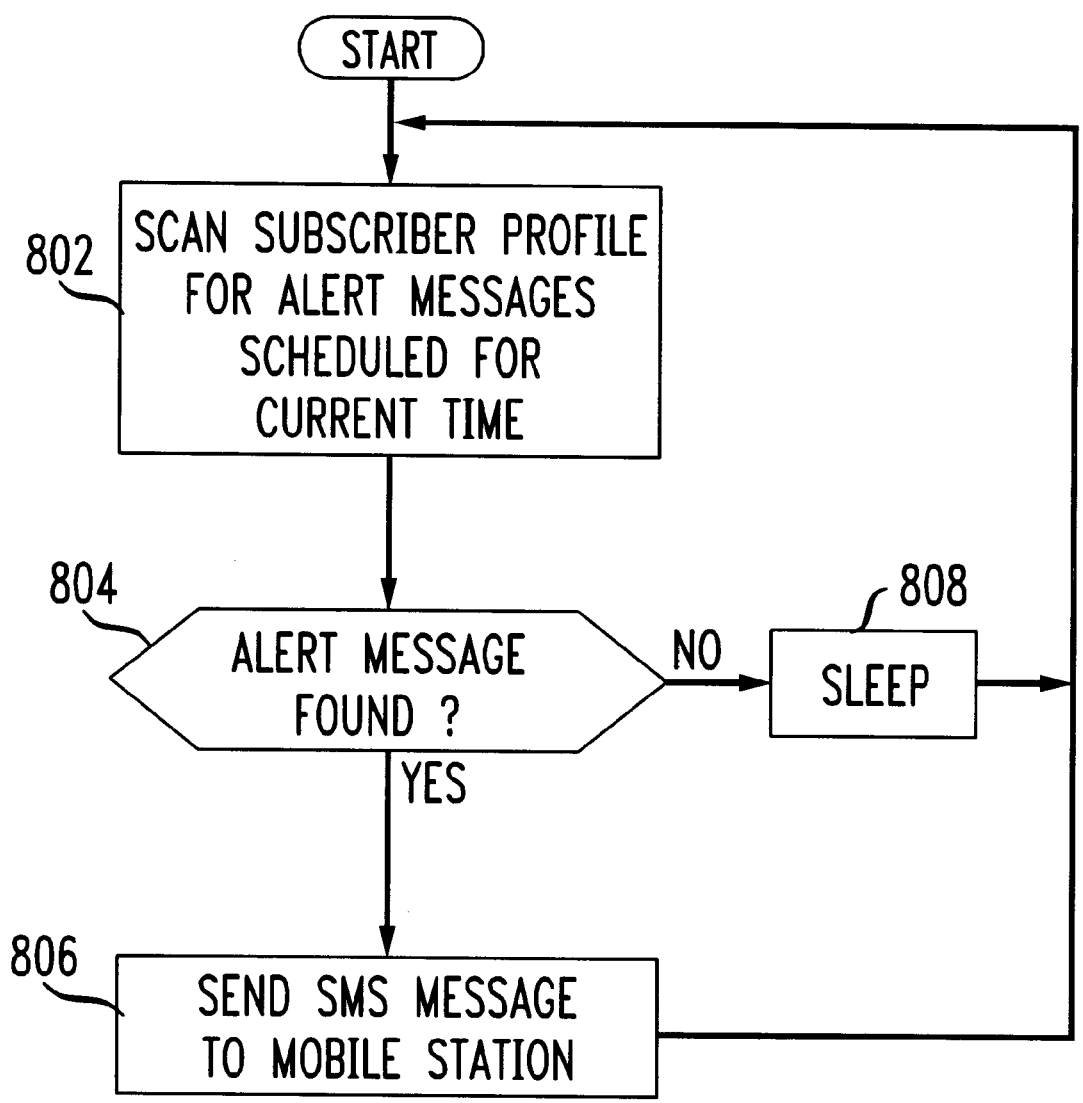
FIG. 8 is a flowchart of the steps performed for message alert processing in accordance with an updated subscriber profile.

Message alert processing in accordance with the updated subscriber profile will now be described in conjunction with the flowchart of FIG. 8. In step 802 the message alert processor 148 scans the subscriber profile records stored in database 118 to determine if there are any alert messages scheduled to be delivered at the current time. If it is determined in step 804 that an alert message feature entry exists in a subscriber profile record for the current time, then in step 806 a short message service (SMS) message is sent to the mobile station 110. In order to initiate the sending of such a message, the message alert processor 148 sends a request to the message center 150 requesting that the message be sent to the mobile station 110. The message center 150 formats the message and sends it to the MSC 104 for delivery to the mobile station 110 via RBS 106. Upon sending a request to the message center 150, the message alert processor 148 returns to step 802 to start the procedure again. If no alert message feature entries are found in any subscriber profile record for the current time, then the message alert processor 148 sleeps (i.e. waits) for a period of time in step 808 and returns to step 802 to start the procedure again.

As an example, consider the subscriber profile record 600 (FIG. 6). At 3:00 PM on Mar. 1, 1996 the message alert processor 148 will scan the subscriber profile records of database 118 and recognize that, as a result of FEATURE-3 608, the message "Meeting room 2B" is scheduled to be sent to the mobile station 110. The message alert processor 148 will send an instruction to message center 150 to generate the message. Message center 150 will generate the SMS message and send it to MSC 104. MSC 104 will send the message to mobile station 110 via RBS 106. As a result, the message "Meeting room 2B" will be displayed in the visual display area 111 of mobile station 110.

It is noted that message alert processing as described above involves the sending of SMS messages to a mobile station 1 10 via a wireless cellular communication network 102. Alternatively, the mobile station could be a conventional paging receiver and the message could be a conventional paging message sent through a paging system instead of a wireless cellular communication network. In such an embodiment, the message alert processor 148 would send the desired message to a paging terminal (not shown) which is associated with a conventional paging system. The paging terminal initiates a page to the unique address of the paging receiver, and upon receipt, the paging receiver will display the message. Conventional paging systems are well known and the details of such a system will not be described in detail here. For further information on paging systems, see e.g., *Wireless Basics,* 2nd Edition, 1996, Telephony Books, Overland Park, Kans., ISBN D-87288-633-6 which is incorporated herein by reference.

Figure 9:
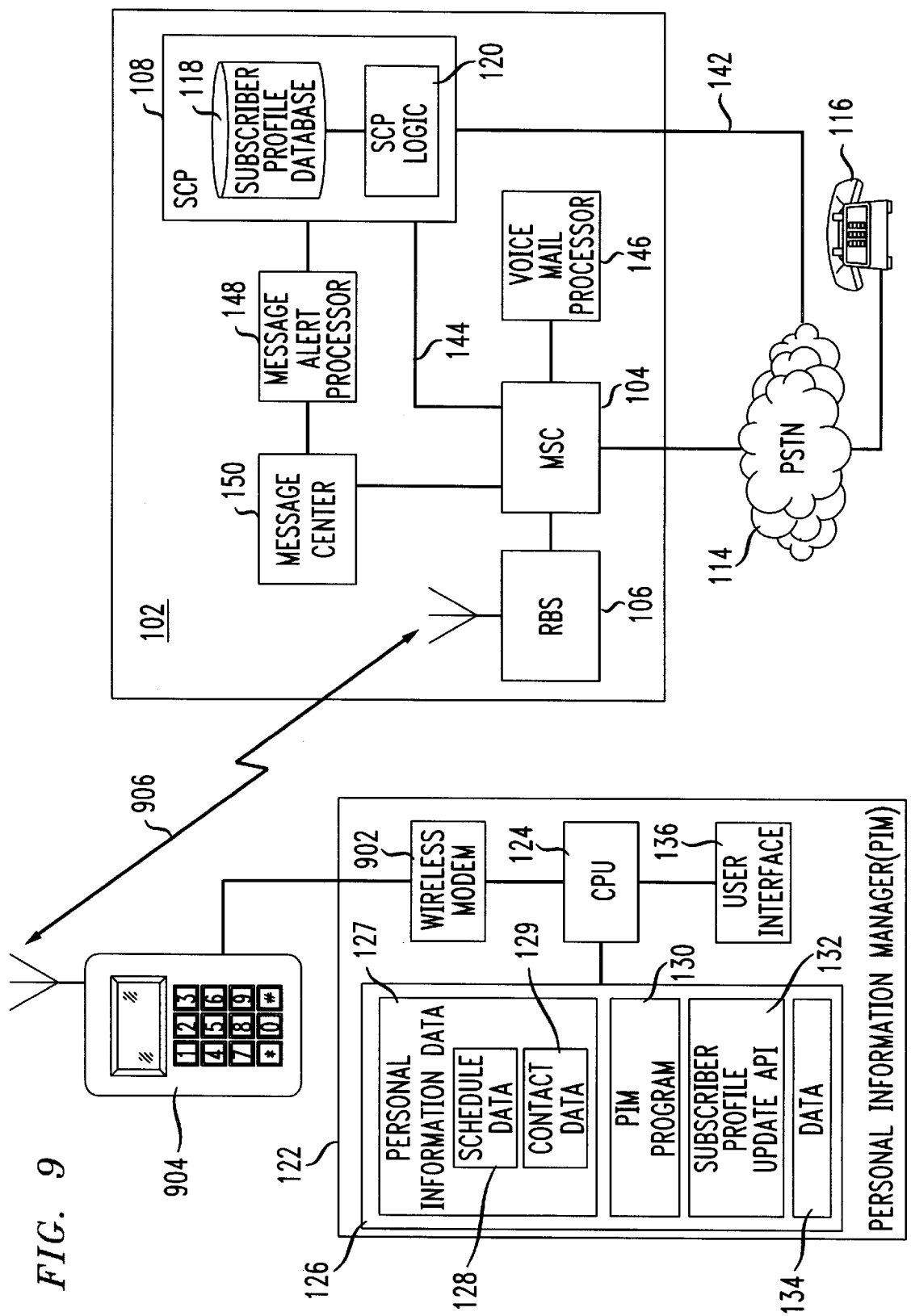
FIG. 9 shows a system for updating a telecommunication subscriber profile via a wireless communication link and for providing telecommunication services based on the updated subscriber profile.

In an alternate embodiment, as shown in FIG. 9, the PIM 122 sends the profile update data to the wireless cellular communication network 102 via a wireless communication link instead of the PSTN 114. The modem 138 of the embodiment shown in FIG. 1 is replaced with a wireless modem 902 connected to a mobile station 904, such as a mobile telephone. Returning to step 310 of FIG. 3, the PIM 122 transmits the profile update data, which is in the TCAP message format, via modem 902 and mobile station 904. Modem 902 and mobile station 904 establish a wireless communication channel 906 with RIBS 106. The profile update data in the TCAP message format is sent to the RIBS 106 over the wireless communication channel 906. The TCAP message is then routed to the SCP 108 via MSC 104 and link 144. The processing of the TCAP message by the SCP 108 remains as described above.

Figure 10:
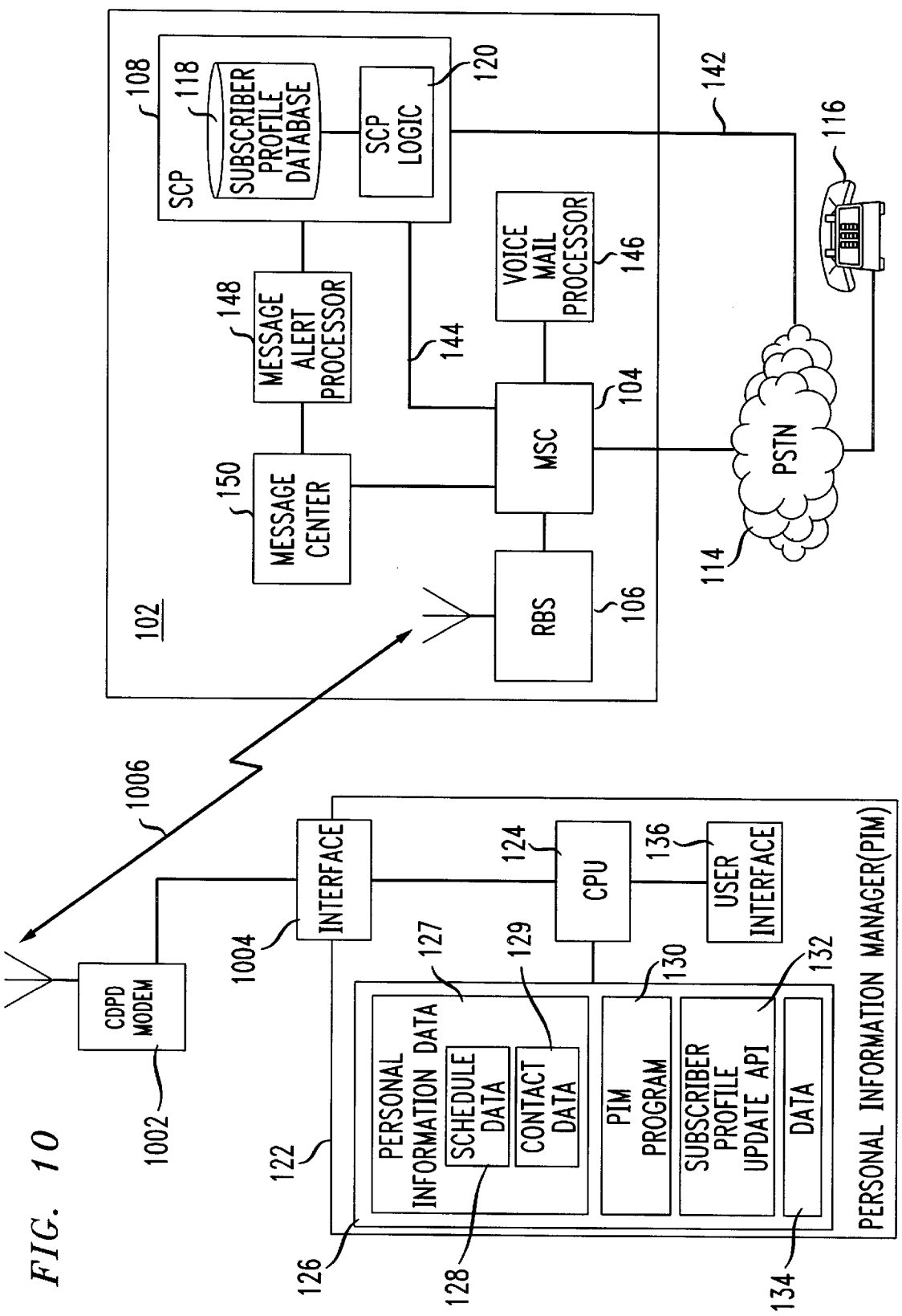
FIG. 10 shows a system for updating a telecommunication subscriber profile via a wireless communication link using a packet data protocol and for providing telecommunication services based on the updated subscriber profile.

In another alternate embodiment, as shown in FIG. 10, the PIM 122 sends the profile update data to the wireless cellular communication network 102 via a wireless communication link using a packet data protocol. The modem 138 of the embodiment shown in FIG. 1 is replaced with a wireless CDPD modem 1002 connected to the CPU 124 via an external interface 1004. Returning to step 310 of FIG. 3, the PIM 122 transmits the profile update data, which is in the TCAP message format, via modem 1002. Modem 1002 establish a wireless communication CDPD protocol channel 1006 with RBS 106. The profile update data in the TCAP message format is sent to the RBS 106 over the wireless communication CDPD protocol channel 1006. The TCAP message is then routed to the SCP 108 via MSC 104 and link 144. The processing of the TCAP message by the SCP 108 remains as described above. Transmission of data using a wireless communication CDPD protocol channel is well known and is described in further detail in *Cellular Digital Packet Data System Specification,* Release 1.1, Jan. 19, 1995, CDPD Forum, Inc., Chicago, Ill., which is incorporated herein by reference.

An advantageous embodiment has been described in which the invention is implemented in conjunction with a wireless communication network. However, it would be clear to one skilled in the art that the principles of the present invention could be implemented in conjunction with a landline communication network (e.g. a telephone network) as well. In such an embodiment, the landline communication network would include a subscriber profile database containing profile information on subscribers to the network. The subscriber profile database may be updated by a personal information manager which is in communication with the subscriber profile database, in a manner similar to that described above. Telephone calls placed within the landline communication network would be processed in accordance with records contained in the subscriber profile database. With respect to alert messages, the alert message could be communicated to landline telephones within the landline communication network at the scheduled time. For example, the message "Meeting Room 2B" (which is used as the example text sent to the mobile station 110 in a wireless embodiment), could be routed to a landline telephone as a voice message using well known text to speech conversion techniques.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A personal information manager device comprising:
   a memory storing subscriber schedule data representing timed events;
   a user interface for receiving a call completion request associated with at least one of said timed events; and
   a modem for transmitting call completion update data based on said call completion request to a telecommunications network node at which subscriber call completion data is stored wherein said subscriber call completion data is updated based on said call completion update data.

2. The personal information manager device of claim 1 wherein said modem transmits said call completion update data via a wired communication link.

3. The personal information manager device of claim 1 wherein said modem is a wireless modem for transmitting said call completion update data via a wireless communication link.

4. The personal information manager device of claim 3 wherein said wireless modem is configured to transmit said call completion update data as packet data via said wireless communication link.

5. A personal information manager device comprising:
   a memory storing subscriber schedule data representing timed events;
   means for automatically generating call completion update data based on said subscriber schedule data; and
   a modem for transmitting said call completion update data to a telecommunications network node at which subscriber call completion data is stored, wherein said subscriber call completion data is updated based on said call completion update data.

6. The personal information manager device of claim 5 wherein said modem transmits said call completion update data via a wired communication link.

7. The personal information manager device of claim 5 wherein said modem is a wireless modem for transmitting said call completion update data via a wireless communication link.

8. The personal information manager device of claim 7 wherein said wireless modem is configured to transmit said call completion update data as packet data via said wireless communication link.

9. A personal information manager device comprising:
   a memory storing schedule data representing timed events;
   a user interface for receiving an alert request associated with one of said timed events, wherein said alert request specifies a predetermined time for transmitting an alert message to a subscriber communication device; and
   a modem for transmitting alert data based on said alert request to a telecommunications network node at which subscriber alert data is stored, wherein said subscriber alert data is updated based on said alert update data.

10. The personal information manager device of claim 9 wherein said modem transmits said alert update data via a wired communication link.

11. The personal information manager device of claim 9 wherein said modem is a wireless modem for transmitting said alert update data via a wireless communication link.

12. The personal information manager device of claim 11 wherein said wireless modem is configured to transmit said alert update data as packet data via said wireless communication link.

13. A personal information manager device comprising:
    a memory storing schedule data representing timed events;
    means for automatically generating alert update data based on said timed events, wherein said alert update data specifies a predetermined time for transmitting an alert message to a subscriber communication device; and
    a modem for transmitting said alert update data to a telecommunications network node at which subscriber alert data is stored, wherein said subscriber alert data is updated based on said alert update data.

14. The personal information manager device of claim 13 wherein said modem transmits said alert update data via a wired communication link.

15. The personal information manager device of claim 13 wherein said modem is a wireless modem for transmitting said alert update data via a wireless communication link.

16. The personal information manager device of claim 15 wherein said wireless modem is configured to transmit said alert update data as packet data via said wireless communication link.

17. A method for operation of a personal information manager device comprising a memory storing subscriber schedule data representing timed events, said method comprising the steps of:
    receiving a call completion request associated with at least one of said timed events via a user interface of said personal information manager device; and
    transmitting call completion update data based on said call completion request to a telecommunications network node at which subscriber call completion data is stored, wherein said subscriber call completion data is updated based on said call completion update data.

18. The method of claim 17 wherein said step of transmitting further comprises the step of transmitting said call completion update data to said telecommunications network node via a wired communication link.

19. The method of claim 17 wherein said step of transmitting further comprises the step of transmitting said call completion update data to said telecommunications network node via a wireless communication link.

20. The method of claim 19 wherein said step of transmitting said call completion update data to said telecommunications network node via a wireless communication link further comprises the step of transmitting said call completion update data as packet data via said wireless communication link.

21. A method for operation of a personal information manager device comprising a memory storing subscriber schedule data representing timed events, said method comprising the steps of:

automatically generating call completion update data based on said subscriber schedule data stored in said memory of said personal information manager device;

transmitting said call completion update data to a telecommunications network node at which subscriber call completion data is stored, wherein said subscriber call completion data is updated based on said call completion update data.

22. The method of claim 21 wherein said step of transmitting further comprises the step of transmitting said call completion update data to said telecommunications network node via a wired communication link.

23. The method of claim 21 wherein said step of transmitting further comprises the step of transmitting said call completion update data to said telecommunications network node via a wireless communication link.

24. The method of claim 23 wherein said step of transmitting said call completion update data to said telecommunications network node via a wireless communication link further comprises the step of transmitting said call completion update data as packet data via said wireless communication link.

25. A method for operation of a personal information manager device comprising a memory storing schedule data representing timed events, said method comprising the steps of:

receiving an alert request associated with one of said timed events via a user interface of said personal information manager device, wherein said alert request specifies a predetermined time for transmitting an alert message to a subscriber communication device; and transmitting alert update data based on said alert request to a telecommunications network node at which subscriber alert data is stored, wherein said subscriber alert data is updated based on said alert update data.

26. The method of claim 25 wherein said step of transmitting further comprises the step of transmitting said alert update data to said telecommunications network node via a wired communication link.

27. The method of claim 25 wherein said step of transmitting further comprises the step of transmitting said alert update data to said telecommunications network node via a wireless communication link.

28. The method of claim 27 wherein said step of transmitting said alert update data to said telecommunications network node via a wireless communication link further comprises the step of transmitting said alert update data as packet data via said wireless communication link.

29. A method for operation of personal information manager device comprising a memory storing schedule data representing timed events, said method comprising the steps of:

automatically generating alert update data in said personal information manager device based on said timed events, wherein said alert update data specifies a predetermined time for transmitting an alert message to a subscriber communication device; and transmitting said alert update data to a telecommunications network node at which subscriber alert data is stored, wherein said subscriber alert data is updated based on said alert update data.

30. The method of claim 29 wherein said step of transmitting further comprises the step of transmitting said alert update data to said telecommunications network node via a wired communication link.

31. The method of claim 29 wherein said step of transmitting further comprises the step of transmitting said alert update data to said telecommunications network node via a wireless communication link.

32. The method of claim 31 wherein said step of transmitting said alert update data to said telecommunications network node via a wireless communication link further comprises the step of transmitting said alert update data as packet data via said wireless communication link.

* * * * *